United States Patent [19]

Mayer

[11] 4,439,824
[45] Mar. 27, 1984

[54] DEVICE HAVING ONE OR MORE MANUALLY CONTROLLED FUNCTIONS

[75] Inventor: Ferdy Mayer, 18 Rue Thiers, Grenoble 38000, France

[73] Assignee: Ferdy Mayer, Grenoble, France

[21] Appl. No.: 209,122

[22] Filed: Nov. 21, 1980

Related U.S. Application Data

[63] Continuation of Ser. No. 571,457, Apr. 25, 1975, abandoned, which is a continuation-in-part of Ser. No. 312,528, Dec. 6, 1972, abandoned.

[30] Foreign Application Priority Data

Dec. 6, 1971 [DE] Fed. Rep. of Germany ....... 2160453

[51] Int. Cl.³ .............................................. G06G 7/70
[52] U.S. Cl. .................................. 364/150; 364/154; 364/185; 364/424; 434/65
[58] Field of Search ............... 364/150, 154, 185, 190, 364/424; 434/65, 71

[56] References Cited

U.S. PATENT DOCUMENTS 3,266,174  8/1966  Bechtol et al. ...................... 434/65

OTHER PUBLICATIONS

Platt, "A Unique Method of Measuring Road, Traffic, Vehicle and Driver Characteristics", IV World Meeting of International Road Federation, Madrid 1962, pp. 11–13.

*Primary Examiner*—Jerry Smith
*Attorney, Agent, or Firm*—Oblon, Fisher, Spivak, McClelland & Maier

[57] ABSTRACT

An apparatus for controlling a device such as a motor vehicle in which a signal representing a manually controlled function is compared with a function signal, and the manually controlled signal is then modified in accordance with the function signal. The function signal is developed by analyzing human functions of the operator, environmental conditions, and vehicle conditions, etc.

23 Claims, 11 Drawing Figures

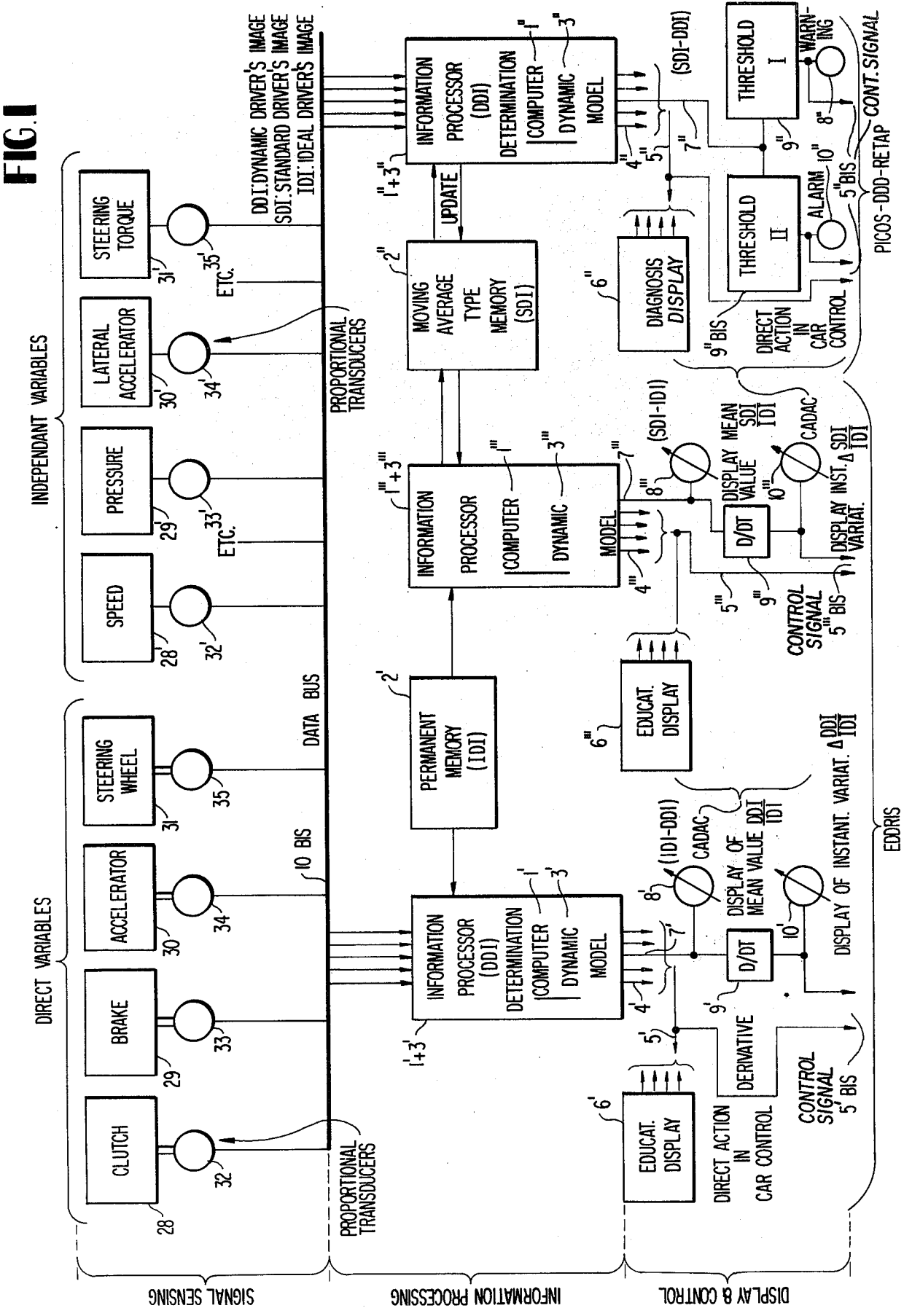

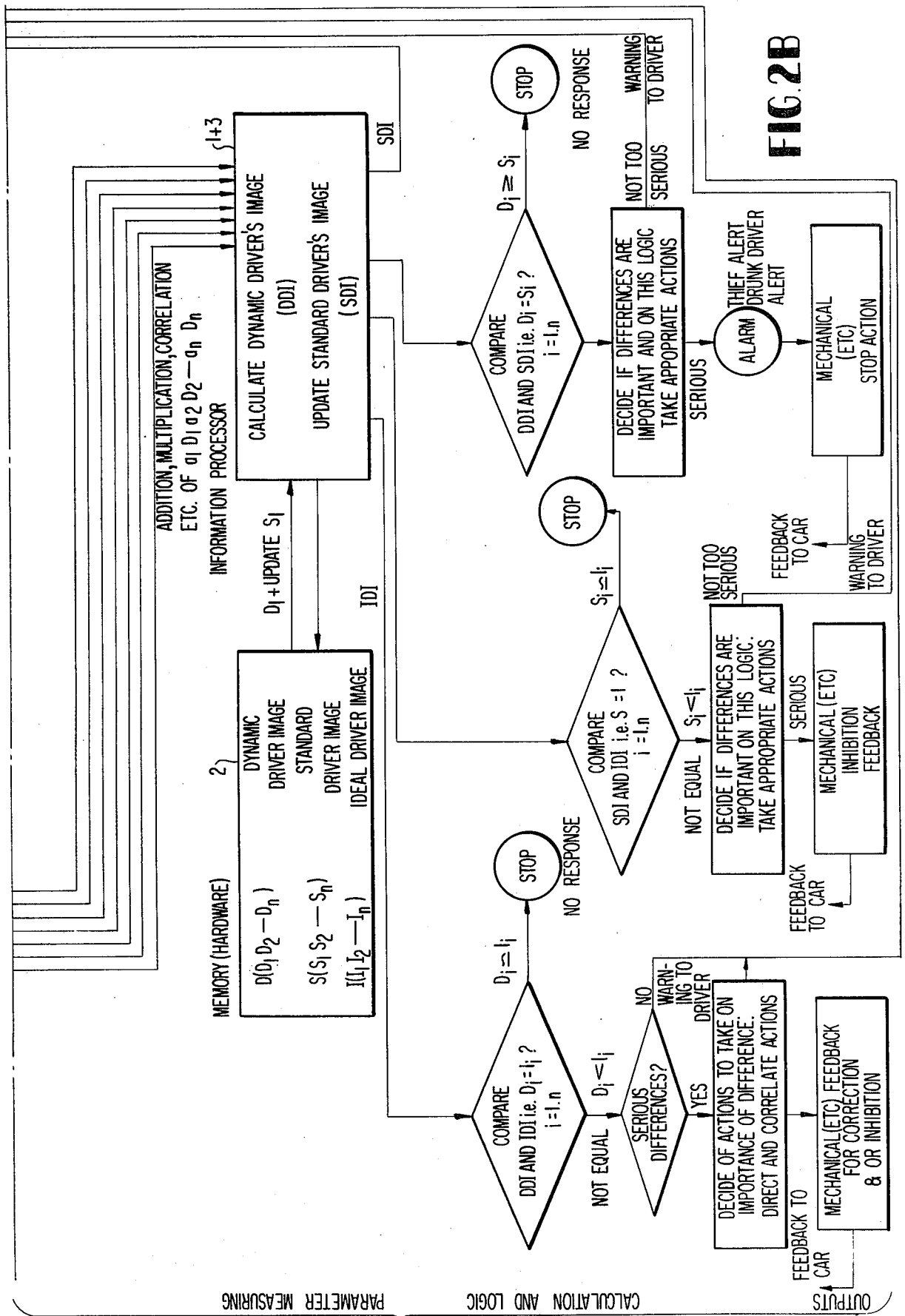

DEVICE HAVING ONE OR MORE MANUALLY CONTROLLED FUNCTIONS

CROSS REFERENCE TO RELATED APPLICATION

This application is a continuation of co-pending application Ser. No. 571,457 filed Apr. 25, 1975, now abandoned, which is a continuation-in-part application of co-pending application Ser. No. 312,528 filed Dec. 6, 1972, now abandoned.

BACKGROUND OF THE INVENTION

1. Field of the Invention

The invention relates to a device having one or more manually controlled functions, such as a motor vehicle, in which one or more feedback loops feed back a signal or signals, representing the controlled functions, to one or more comparators, in which the control order is compared to the function signal and a differential signal formed to control the function in question.

2. Prior Art

An important number of theoretical and experimental studies have described the optimum dynamic behaviour of a vehicle, studies based on the actual moving vehicle technology, with propulsion by wheels, steering by wheel inclination, braking through wheels, etc.

Dynamic conditions of this behaviour, are becoming specifications for the car makers, for the tomorrow's car: as for example, braking performances, steady state, yaw response, transient yaw response, returnability, lateral acceleration, breakaway, directional stability, etc. The corresponding minimum safety limits have been established in the "American Proposal Limits for ESV-Specifications" (U.S.—DOT).

It seems reasonable to assume, at a first glance, that with international accepted safety rules for the car, safety would be so much improved, that accident rates and death toll could show a significant decrease. Unfortunately, reality is different: some recent surveys show that more than 90% of the direct causes of accidents, and more than 70% of the indirect causes, are not to be attributed to the car, but to the driver, and his reactions at the controls of the vehicle, in connection with the road conditions. (Mr. Sherigu International Conference on E.S.V.—October 1971).

So, there is no doubt that the "ultimate" safe transportation must not take in account only the vehicle and the road, but also the behaviour of the driver. Driver behaviour, driver reactions in given situations, assessment of driving skill, etc. have been analysed and the results have been published, especially in the recent past.

So it was known that even simple motor tasks, have "learning curves" on extended periods, that is to say improvement replaces lack of performance, i.e. driving risks and potential danger towards others. (O. G. Edholm, *The Biology of Work*, McGraw-Hill, 1967). In general, skill at any task increases with experience and, in driving, is related to smoothness of control and coordination of the various controls. In the last ten years, several researchers have attempted to use instrumented cars, to assess a driver's performance. Studies done by Greenshields and Platt suggest that a more skilful driver uses fewer control motions (brake, accelerator and steering) and that drivers can be separated into groups of differency experience and ability on the basis of the pattern of their control movements. (B. Greenshields, "Driving Behavior and Traffic Accidents", *International Road Safety Congress Proceedings*, 1962; and N. Greenshields and F. Platt, "Development of a Method of Predicting High-Accident and High Violation Drivers, "*Journal of Applied Psychology*, Vol. 51, no. 3, 1967). Safren et al conducted similar experiments, but used a closed track with no other traffic and each subject did several runs, as opposed to only one. They found that patterns of correlation between the various measures differed between experienced and inexperienced drivers. (M. Safren, S. Cohen and L. Schlesinger, "The Drivometer as a Measure of Skill," *Journal of Safety*, March, 1970). Wooler (1972) used consistency of behaviour of the driver within the traffic stream (passing movements, speed, running time) rather than control movements to rate drivers. (J. Wooler, "The Measurement of Driver Performance," *Ergonomics*, 15(1), 1972).

Some work has also been done, mainly by Mc. Lean and Hoffman on the stimuli which cause particular patterns of control movements (mainly steering) to be made. (J. McLean and E. Hoffman, "Analysis of Drivers' Control Movements," *Human Factors*, 13(5), 1971, J. McLean and E. Hoffman, "The Effects of Lane Width on Driver Steering Control and Performance," *Austrailian Road Research Board Sixth Conference Proceedings*, 1972; and J. McLean and E. Hoffman, "Steering Reversals as a Measure of Driver Performance and Steering Task Difficulty," unpublished). It has been shown that, under normal circumstances, steering is mainly stimulated by the changing heading rate of the car. Under difficult circumstances, the lateral movement of the car, with respect to the edge of the lane may also stimulate steering responses.

Very recently Smiley used statistical techniques to analyse repetitive experiments, and to study correlations in the driver's behaviour. (A. M. Smiley, "The Measurement of Driver Performance," *Canada National Aeronautical Establishment*, Report LTR-ST, 63B, Sept. 11, 1973.).

SUMMARY OF THE INVENTION

The object of the invention is, after retrieving from these results, completed by personal investigation, a set of logical rules concerning this driver's behaviour, to apply these rules, through appropriate algorithms, so as to assess objectively the driving skill and to complete or even replace in certain cases, the driver's action by an automatic action, so as to improve driving and/or to avoid accidents by correction or inhibiting means.

A detailed investigation, in addition to prior art, has shown several basic facts, first concerning the man-road interface:

each driver has his own way to drive a car, that is to say
   shows a unique driving pattern (i.e. pattern of control movements like steering, accelerating, braking),
these unique driving patterns remain constant in time,
these driving patterns have a high correlation (between
   the basic actions) during any improvement of the
   driving skill i.e. at a longer term.

Of course, driving patterns and driving pattern correlation differ from one driver to another driver of the same overall skill, as they differ between experienced and inexperienced drivers.

Second, on the man-machine interface, the investigation has shown:

each driver has his own way to actuate the car; this is to
   say, he shows a unique pattern (i.e. pattern of control movements during starting, gear shifting, braking, stopping, etc.)

these unique control patterns remain constant in time, these control patterns have a high correlation during any improvement of the driving skill.

So, control patterns and control patterns correlation differ from one driver to another driver of the same overall skill; as they differ between experienced and inexperienced drivers.

Here are some illustrations to these very important points, to make them more clear. First on the driver-road interface:

a good driver has significantly fewer steering reversals, than a less skilled driver, i.e. he focusses his braking at a longer distance, a good driver, in a dense traffic (and during lane-changing, passing, etc.) uses less brake applications, to maintain an average speed; i.e. he anticipates better, probably by observing environmental factors at a longer distance, and/or with a faster response time, a good driver, in the last case, uses more accelerator reversals than a less skilled driver, to regulate speed—fact to be related to the last, in all these different examples, several corrolative parameters intervene, like density of traffic, speed, etc. and absolute maxima of performance exist, which are functions of the driving skill, Second, a few examples, on the man-machine, i.e. driver-car interface a good driver has a significantly shorter starting time (and gear shift changing time, in European cars) than a less skilled driver, i.e. his gear shift operation, acceleration profile, double shift, etc. are in a smoother coordination, a good driver has a more effective brake action than a less skilled driver; i.e. his brake actuation, additional motor brake, double shift etc. are in a smoother coordination, with a better braking efficiency, a good driver, in a dense traffic (lane changing, passing) uses more gear shift operations than a less skilled driver to optimize his control pattern, in all these examples, several correlation parameters intervene, which give different types of optimization, as for example, the lowest gas consumption, the smallest interval of "traction loss", the minimizing of chances to trigger skidding, etc.

Now one can emphasize a few fundamental points, as related to the present invention:

These studies have shown that the number of occurence and the intensity of the different actions, and their patterns can be uniquely related to a given driver, and the resolution is fine; i.e. the number of variables considered and the number of the intermediary values (amplitudes) of each is high.

The invention advantageously provides a computer established "driving picture", which can be obtained by analysing the different actions, as described, and by giving a corresponding "weight" and using eventually different significant correlations between the variables. Analysis of the different actions is made by different sensors, probing human reactions, the motor vehicle reactions and finally road parameters.

According to the invention, a sensor is provided for every one or more of the following parameters influenced by human reactions:

(a) Frequency and strength of brake activation,
(b) Frequency and strength of accelerator activation,
(c) Frequency and direction of steering wheel deflection,
(d) Frequency of switching operations,
(e) Speed range of engine which is used,
(f) Time lapse between the switching and coupling operations,
(g) Speed as a function of steering wheel deflection (in curves)
(h) Frequency of horn activation,
(i) Stresses on the suspension, and
(j) Correlation between individual control commands.

A sensor should also be provided for every one or more of the following body parameters, if the safety requirements are more rigid:

(a) Pulse beat,
(b) Temperature,
(c) Blood pressure,
(d) Encephalogram-frequency, and
(e) Respiration.

The evaluation of only a small number of the above parameters allows a quite individual electronic image of the person in control to be obtained.

In the case of a motor vehicle, a sensor is preferably provided for one or more of the following parameters:

(a) Oil temperature and pressure,
(b) State of the lights,
(c) State of the brakes,
(d) Tire pressure,
(e) Dead load,
(f) Battery charge,
(g) Exhaust composition,
(h) Fuel reserve,
(i) Vehicle pitch,
(j) Lateral tilt of vehicle,
(k) Maximum engine speed,
(l) Maximum speed of vehicle,
(m) Specific gear positions,
(n) Spring characteristic,
(o) Shock absorber characteristic,
(p) Lighting
(q) Heating, and
(r) Ventilation.

According to the invention, a sensor should also be provided for every one or more of the following external parameters:

(a) Temperature,
(b) Moisture content,
(c) Wind,
(d) Quality of the roads,
(e) Inclination of the road, and
(f) Brightness.

The different studies mentioned have shown high correlation (between the basic driving and control patterns) over longer time-periods, and even including learning phases and improving phases of driving skill; according to another embodiment of the invention, this fact justifies the concept of "driving signature", personal to each driver, by considering significant patterns and their correlations, as established through the computer.

According to another embodiment, significant patterns and pattern correlation can, of course, be stored in electronic memories in this computer. For practical purposes, one can define:

a dynamic driver's image, referred hereto as D.D.I., which corresponds to the instantaneous control and driving pattern and the quasi-instantaneous correlation pattern, a standard driver's image, referred hereto as S.D.I. which is stored in an active memory, updated for each significant change of the dynamic image (D.D.I.), which keeps, in statistical terms, a "moving average", and an ideal driver's image, referred hereto as I.D.I. which is stored in a read only memory, and which contains the absolute maxima of performances of a very good driver.

If one considers, for example, that the regular driver of the car is not in his normal behavioural state (tired, drunk, nervous . . . ), it has been shown that there, the dynamic image (D.D.I.) changes: the different patterns and their correlations show definite deviations, always towards a lesser degree of coordination, and generally towards slower paces. Comparison between S.D.I. and D.D.I. show these factors and appropriate steps can be taken for safety. This aspect is referred hereto as "Drunk Driver Detector"—D.D.D.

If one considers, another example, that a foreign driver actuates the car: the difference between fast established new D.D.I., even approximate, and the S.D.I. is such that the new driver is identified as "foreign" and appropriate steps can be taken for security. This aspect is referred hereto as "Personal Identification through Control of Signature"—PICOS.

According to another embodiment, the computer establishes a permanent comparison between S.D.I. and I.D.I. and a corresponding display, this is to say a kind of "performance index", which shows at every moment the real objective driving skill of the driver, with the corresponding incentive to improve, at a long term, driving skill and ability. Instantaneous information for such improvement is given by a "variometer", i.e. the instantaneous indication of a good or a bad control or driving action. The educational value of this embodiment of the invention, with the concept of human engineering, is here a major new aspect, with the introduction of the principle of challenge and reward to the driver, replacing the classical techniques of enforcement and punishment of the driver. This aspect is referred hereto as "Educational and Display for Driving Skill"—EDDRIS.

A particularly advantageous embodiment of the invention is characterized in the possibility to define, through the I.D.I. memory, definite limit—pattern and limit-correlations, i.e., above which an instantaneous control and driving action becomes dangerous—corrective actions or inhibitive actions are then fed into the control and driving hardware, and override the driver's actions.

In this aspect, the computer can take over dynamic actions of the machine, from minor corrections in the control actions, to a complete standstill of the car.

In this case, the car, (which is to be considered as an open-loop system by itself, closed through a feedback through the driver, sensing road and traffic, and acting in consequence the different controls of the car), becomes a closed loop adaptive feedback system. This very general aspect is referred hereto as "Computerized Adaptive Distribution and Control"—C.A.D.A.C.

Its concept is very general, indeed, the feedback encompassing the driver is or may be included in the different embodiments mentioned.

BRIEF DESCRIPTION OF THE DRAWINGS

The invention will now be described with reference to the accompanying drawings, in which:

FIG. 1 is a block diagram of a system according to the invention;

FIGS. 2A and 2B, taken together, is a flow graph of the same;

DESCRIPTION OF THE PREFERRED EMBODIMENTS

Figure 2A:
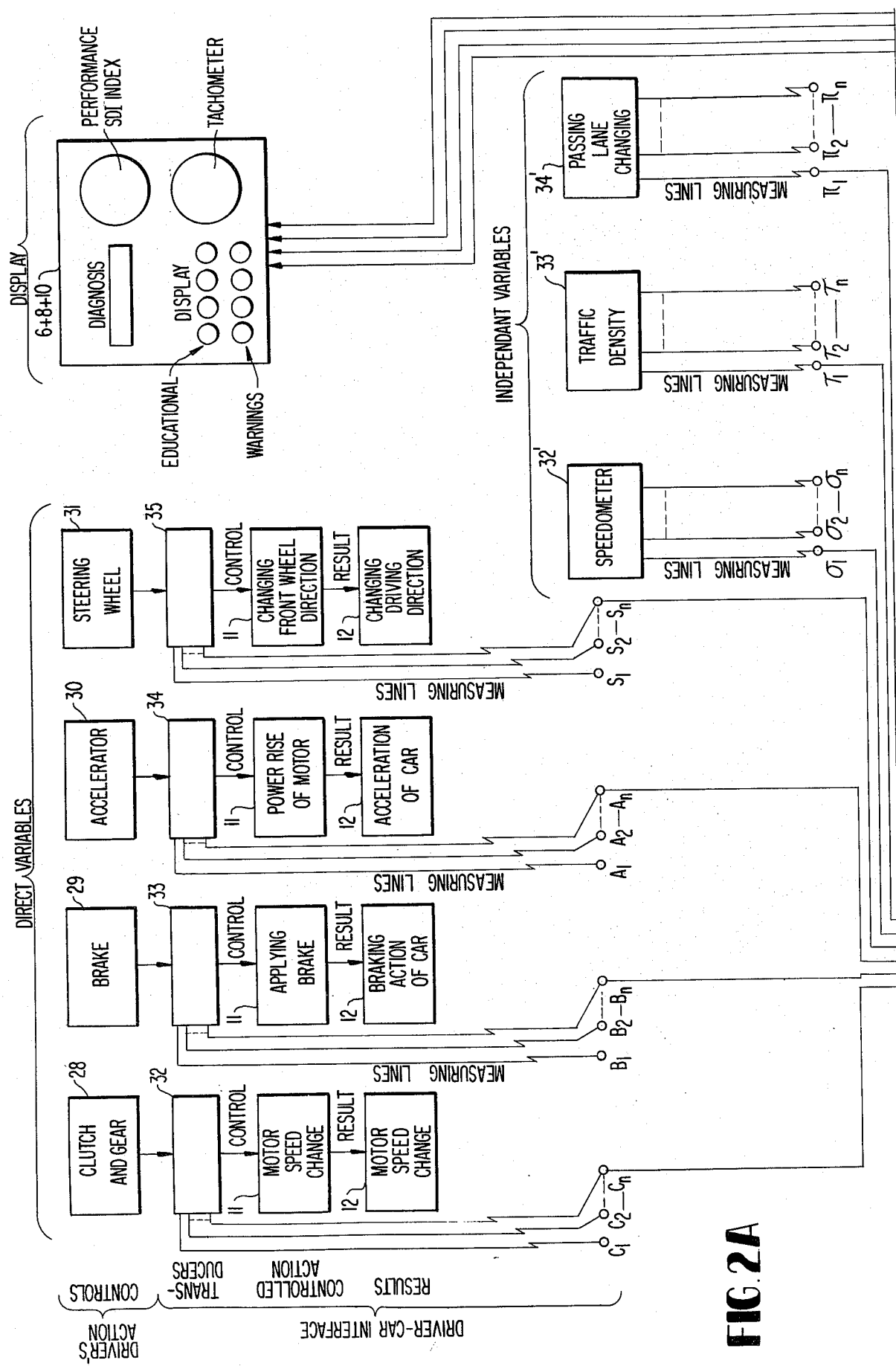

According to FIG. 1, the driver acts on a control member of the car, which may be, for example, clutch 28, brake 29, accelerator 30, or the steering wheel 31. These are termed "direct variables".

Through position transducers 32, 33, 34, 35, the output signal of the control member, is transformed into an electrical equivalent.

The car will react to this control, by changing its speed, by accelerating etc.; the road will react towards the car by lateral acceleration in a turn, by creating a counter-torque on the steering wheel, etc. The "independant variables" for example, the speedmeter 28', oil-pressure meter 29' etc. are transformed by classical on-board transducers 32' and 33'; less "classical" variables like lateral acceleration 30', steering torque 31' etc., are measured by transducers 34' and 35', which transform them into correspondent electrical signals.

Further direct and independent variables, may of course be sensed, as listed above, according to the invention, and examples of these will be developed later.

The different variables sensed, through a data bus 10, are forwarded to an information processor, which has been presented, for explanation's sake, in three partial processors: 1', 1", 1"', plus 3', 3", 3"', which have different purposes:

Computer 1' establishes, through the different algorithms, direct and correlated variables, as explained in general, the dynamic driver's image D.D.I., which is a fluctuating instantaneous set of significant factors concerning the driver's, the car's and the road behaviour. These factors are dynamically compared to an "ideal" behaviour, I.D.I., as stored in permanent memory 2'. Dynamic deviations (I.D.I.-D.D.I.) are established, by summing and weighing meaningful deviations in the dynamic model 3'.

The multiple outputs 4' of the dynamic model represent instantaneous "imperfections" in the different control, test, and dynamic actions of the car. Through data bus 5', they may be displayed selectively to the driver, through display 6', which represents an "educational display", presenting what has been wrong, or what should have been the right action (EDDRIS). Through data bus 5' bis, too, different inhibition corrective actions can be made by direct action in the car control.

One particular output 7' is provided, according to the invention, established by a weighed summation of chosen outputs 4', representative to the overall driving-skill. Average value of output 7' is displayed in analog or numerical display 8', representing for example the ratio D.D.I./I.D.I., i.e. a coefficient showing the overall skill, compared to the ideal driver, as memorized in memory 2'. A derivation 9' is established from the signal 7'; the corresponding display 10' will show instantaneous variations of the driving performance D.D.I.-/I.D.I. and as an instantaneous reward or punishment help to educate the driver by an objective challenge.

The second part of the information processor 1" plus 3" establishes, through the different algorithms, (which may be the same as above) direct and correlated variables, as explained in general, the same (or another) dynamic driver's image, D.D.I.

The different significant factors drive a moving average type memory 2", which integrates and averages variables and correlated variables, so as to establish a long term, very slowly changing standard driver's image, S.D.I., which represents the normal driver's "driving signature". The permanent comparison of the dynamic image D.D.I. with the long term standard image S.D.I., shaped by dynamic model 3", is two-fold. The multiple outputs 4" of the dynamic model represent instantaneous "differences", in separately considered different variables and correlated variables. Through data bus 5", they may be displayed selectively to the driver, through display 6", which represents a "diagnosis display", presenting the impaired or wrong operation of a variable, or a complete function. By this way remote testing of appliances and functions (RETAP) can be realized.

One particular output 7" is provided, according to the invention, established, by a weighed summation of chosen outputs 4", which is representative of a "personal driving signature". Dynamic deviations between S.D.I. and D.D.I., if greater than a first threshold, shown as threshold I, 9", may indicate abnormal reactions, bad reflexes, etc., i.e. be representative for a tired or drunk driver (D.D.D.). A warning 8" may be triggered, and through 5" bis feedback action, the car may be not allowed to start or, if started, the car is stopped. A second threshold, (9" bis), indicates clearly a person different from the normal driver, and may serve as theftalarm 10" (PICOS), as mentioned earlier. It is evident, according to the invention, that outputs 4" may be used for the last two operation modes. They may be considered as a digital type lock, where only a good correlation between actual and past driving functions and behaviour may unlock the car.

The third part of the information processor 1'" plus 3'", has basically the same purpose as the first part 1' plus 3'. The main difference consists in the comparison of the ideal driver's image I.D.I. with the standard driver's image S.D.I.; indeed, certain correlated variables, necessary for the educational purposes and more especially the different feedback functions 5', 5", 5'" and 10', 10", and 10'" are to be based on average values of the variables and correlated variables, instead of instantaneous dynamic values.

According to the invention, the different outputs 4', 4", 4'", 5', 5", 5'", 8', 8", 8'", and 10', 10", 10'" may be stored or recorded by any known means; this is the "black-box" approach, known for heavy trucks, and too, for aeroplanes. These different outputs, and more especially 4'", 5", 8", 10", may be used for a "diagnosis-terminal", so as to evaluate the need for repair of the car by appropriate external instrumentation.

FIG. 2 shows the general flowgraph, according to the invention. In this figure, computers and models of FIG. 1 are assembled in unit 1 plus 3; the different memories are assembled in unit 2. The same direct variables are presented 28, 29, 30, 31, and the corresponding transducers 32, 33, 34, 35. Each transducer is shown as presenting multiple outputs. As a typical example, transducer 32 may deliver an on-off signal, or signal proportional to the force applied to brake, a signal proportional to brake fluid pressure, a signal proportional to brakepedal motion, etc. As another example, the steering wheel transducer 35 may deliver a signal proportional to steering wheel angle, a signal proportional to steering wheel velocity, a signal proportional to steering wheel torque, etc. Independent variables are indicated as speed, as sensed by speedometer 32', as traffic density 33' and passing lane changing 34'.

In FIG. 2, a more complete action-chain, following the control devices and transducers, is indicated. So the last trigger the controlled actions 11, and will have the results 12, as for example, acceleration or braking, etc.

Finally, this figure presents the different displays 6', 6", 6'", 8' 8", 8'", 10', 10", 10'", brought together on a same display board. The flowgraph is self explanatory. Comparisons between D.D.I. and I.D.I., S.D.I. and I.D.I., and finally D.D.I. and S.D.I. decide warning and alarm displays or corrective and/or inhibitive action through feedback to the car.

Figure 3:
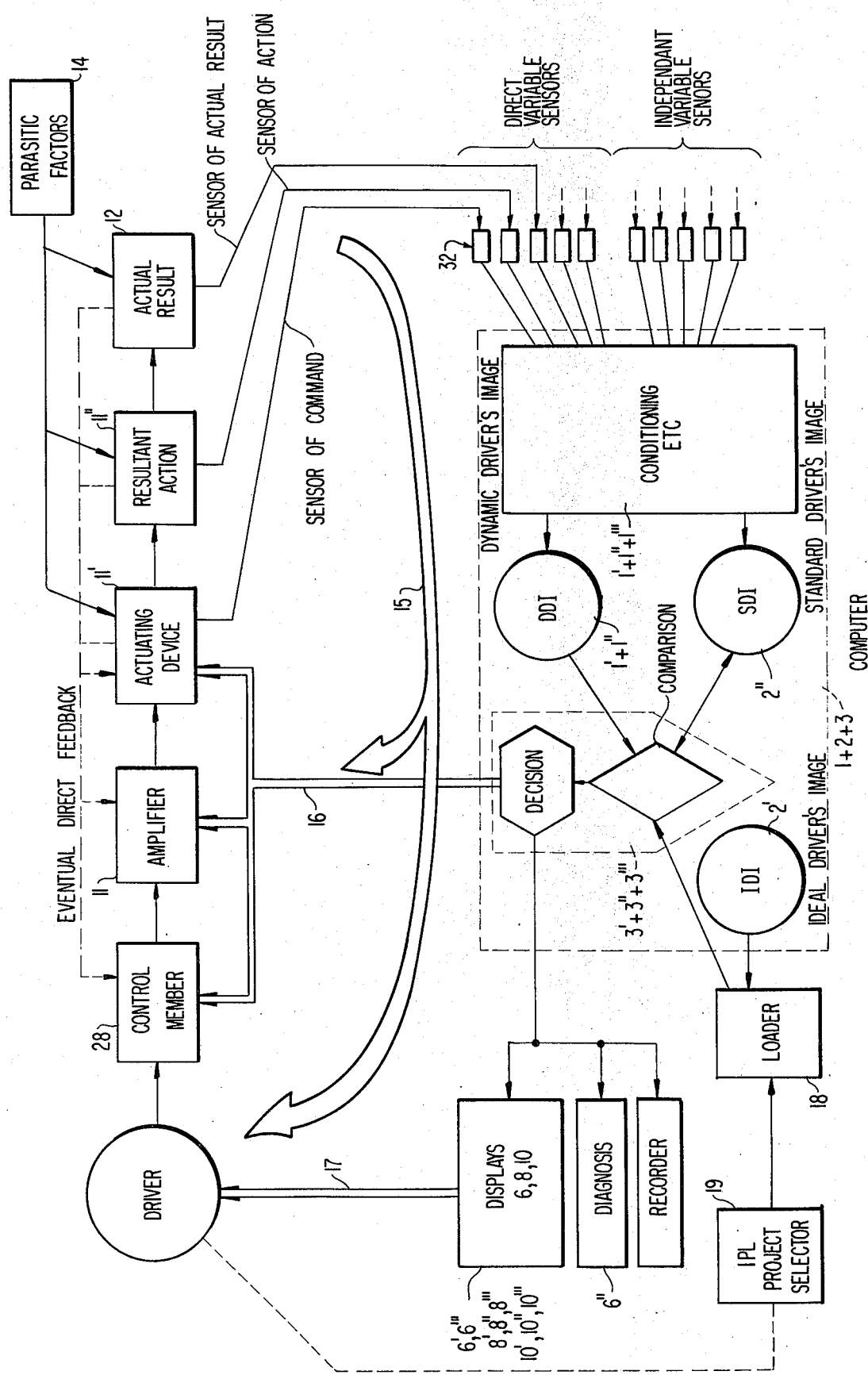
FIG. 3 corresponds to FIGS. 1 and 2, redrawn, so as to show a specific feedback action, according to the invention.

FIG. 3 shows FIG. 1 and FIG. 2 redrawn, for the automatic control engineer, showing the feedback action, according to the invention. In this figure, the action-chain introduced in FIG. 2 is developed in detail, with the consideration of only one precise control, for clearness's sake (which could be acceleration or braking, for example). According to the drawing, the driver acts on a control member 28, which may be the acceleration or brake pedal on the motor vehicle. The output signal of the control member 28 is applied via an amplifier 11 to an actuating device 11'; i.e. the gas admission flap or valve to the motor or the pressure at the jaws of the brake's disc. The resultant action 11" (propulsion power or braking power) determines the real final result 12 (acceleration or deceleration), which may of course be influenced by parasitic factors 14, intervening at levels 11', 11" or 12, like, for example, in the case of the braking: broken hydraulic lines, wet friction surfaces on the brake discs, or skidding.

As described, one or several sensors 32 evaluate the functioning of the actuating device 11', actual response 11" and the actual result 12, and together with signal furnished by independent variable sensors, (for example, temperature of the brake, wear of its friction surfaces, loss of hydraulic pressure, presence of water and formation of ice on the road, etc. would be significant "independent" variables) determine the inputs to the processor 1+2+3.

The drawing emphasizes, by flow 15 the general automatic control. Indeed, outputs 16 and 17 close the overall loop, and constitute the feedback action, as will be explained.

Processor 1+2+3 is decomposed in its major functions: conditioning and integrating 1', 1", 1'", with establishment of Dynamic Driver's Image D.D.I. 1'+1", and updating Standard Driver's Image (S.D.I.) Memory 2", Comparison and Decision 3', 3", 3'", as explained in detail earlier.

The decision once established, through displays 6', 6", 6'", 8', 8", 8'", 10', 10", 10'" is fed back to the driver through path 17; the latter can now take correction, inhibition or evasive actions to his first hand control action, i.e. the control loop is closed.

In the same way, decisions established can be fed back directly, through path 16 to the control member 28, or Amplifier 11, or Actuating Device 11', and so close the automatic control action, without the intervention of the driver.

The drawing shows more in detail too, the realization of a new aspect: the variable "Ideal Driver's Image", i.e. how the "dead" I.D.I. memory 2' may be changed. Indeed, such a possibility is an interesting feature, according to the invention. This is done by Driving Profile Selection 19, through a loader 18. A few examples will illustrate the concept. This selection can be introduced to take in account, for example, the desirability of a "sporty" driving, compared to maximum security driving, or of a different optimum driving pattern as it may be necessary in a different type of car; it can be envisaged too for enhancing certain "social-economic" factors, like economy driving. In this latter case, for example, the ideal driver challenges the actual drivers to optimize gas consumption.

This profile selection is of course not at the driver's disposal; it corresponds, in simple terms to the possibility to modify the terms of the definition "ideal".

Figure 4:
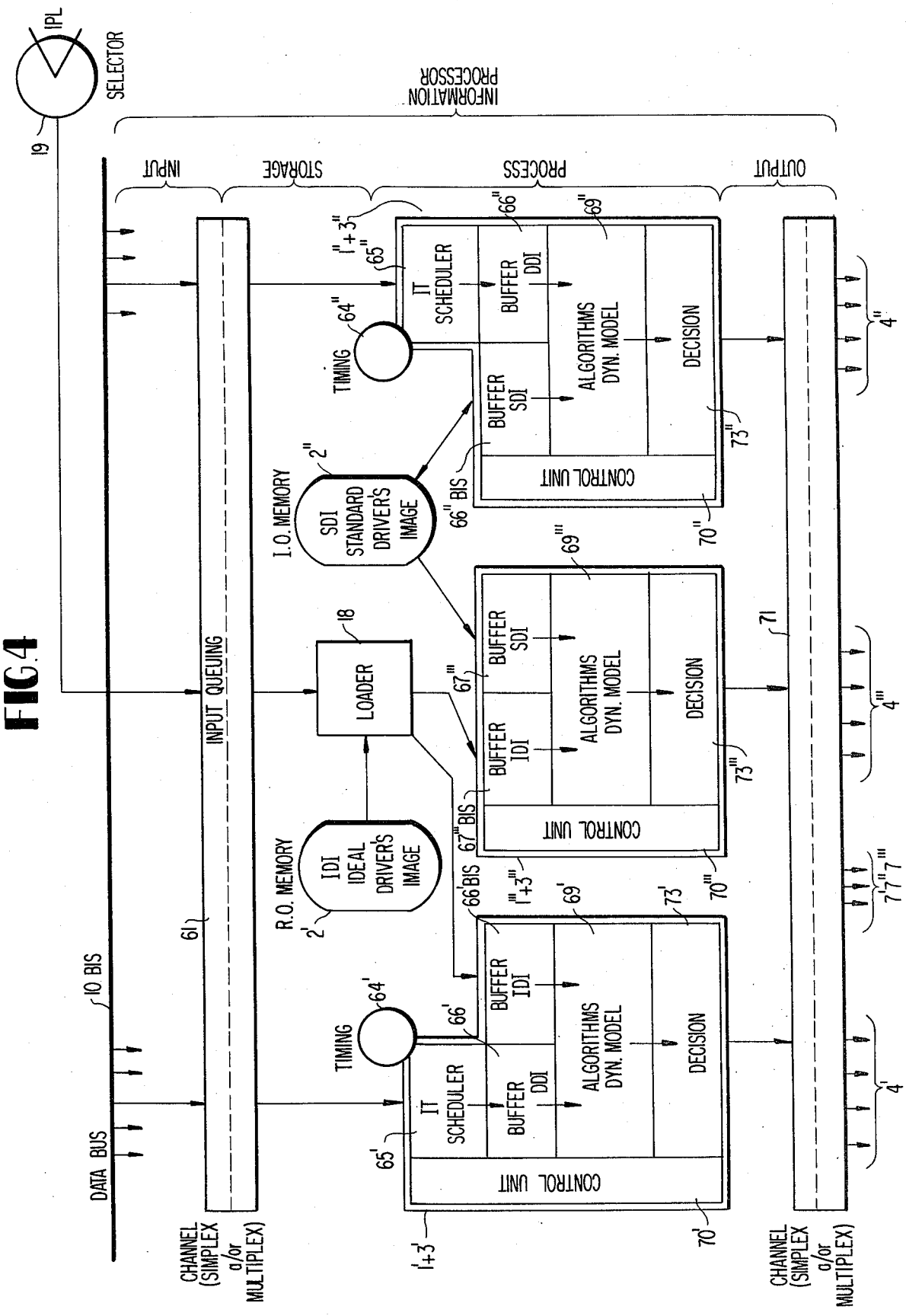
FIG. 4 corresponds to the physical realization i.e. the architecture of the information processor.

In FIG. 4, according to the invention, the architecture of the information processor is detailed, presented in classical terms of computer technology. In this figure, sensor information from data bus 10, is routed to Input Queuing Channel (simplex and/or multiplex) 61, where they are stored As long as this input queuing is not empty, the channel alerts the interrupt schedulers 65' and 65", which, if operating, read the oldest information then retrieved from the input queuing.

The Standard Driver's Image (S.D.I.) is stored in an input/output memory (I.O.M.), 2", for example, a floppy disk or an input/output tape or a drum, etc. The S.D.I. is recopied in buffer 66" bis at determined intervals, as for example, at the beginning of each start of the car. Each time S.D.I. is updated in 66" bis, the new image is recopied in storage device 2" in replacement of the preceding image. The content of the latter is then recopied in Buffer 67"'.

The "Ideal Driver's Image" (I.D.I.) is stored in a read only memory (M.O.S.-R.O.M.). The I.D.I. is composed of the complete set of values of variables and correlated variables, including all possible images of different types of driving behaviour, etc. i.e. including all the situations cited in the examples earlier. Loader 18, at each start of the car (or each command sent by selector 19), initiates buffers 67"' bis and 66' bis, by recopying there the I.D.I. and taking in account the informations delivered by selector 19.

Interrupt Schedulers 65' and 65", with integrated internal clocks 64' and 64", retrieve at the right moment the information from waiting line 61.

The information, as it goes through Interrupt Schedulers 65' and 65", is stored in the warning memories 66' and 66"; this information constitutes the Dynamic Driver's Image (D.D.I.).

On one hand, buffered core memories, 66" bis and 67"' contain the standard driver's image (S.D.I.), which is connected to memory 2", as explained earlier. In memory 66" bis, S.D.I. is actualized by device 69" (explained hereunder) and duplicated in memory 67"', via I.O. Memory 2". These operations are, of course, necessary because of the updating of S.D.I. memory 2".

On the other hand, the Ideal Driver's Image I.D.I. is contained (in addition to the mentioned permanent storage in memory 2') in buffered memories 66' bis and 67"' bis. I.D.I. is recopied in these, at the beginning of each cycle defined earlier (new start, etc) via loader 18, and taking in account, if necessary, the modifications brought by selector 19.

According to the invention, the information is conditioned and processed by algorithms. Core memories 69', 69", and 69"' are running these specialized algorithms, to constitute the "dynamic model", adapted to each parameter set of values. These algorithms and models originate the decisions, as mentioned already in FIG. 3, and as will be detailed later in the general algorithm, FIG. 5.

Special units 70', 70", 70"', are the usual control units of the computing devices.

The decisions taken in 73', 73", 73"', depending of course on each situation, are transmitted via channel 71 to either:

different displays or outlets 6', 6", 6"', 8', 8", 8"',10', 10", 10"', which give the driver a direct evaluation of his behavior (FIG. 3, line 17), and/or different commands to the car itself, which may substitute partially or totally the driver's control (FIG. 3, line 16).

As already mentioned above with respect to FIG. 3, loader 18 and profile selector 19 realize the selection of driving profile, i.e. modulate the driving challenge through modification of the I.D.I. By selecting (or imposing) a type of driving profile by selector 19, a command is sent to loader 18, which selects the corresponding "profile" in the Read Only memory 2' and load working memories 67"' bis and 66' in consequence.

Finally, decisions from the computer programs 73', 73", and 73"' are sent to the channel (simplex and/or multiplex) 71, and are queued. Whenever possible, this channel sends a control signal through lines 4', 4", and 4"' to control and display.

Figure 5:
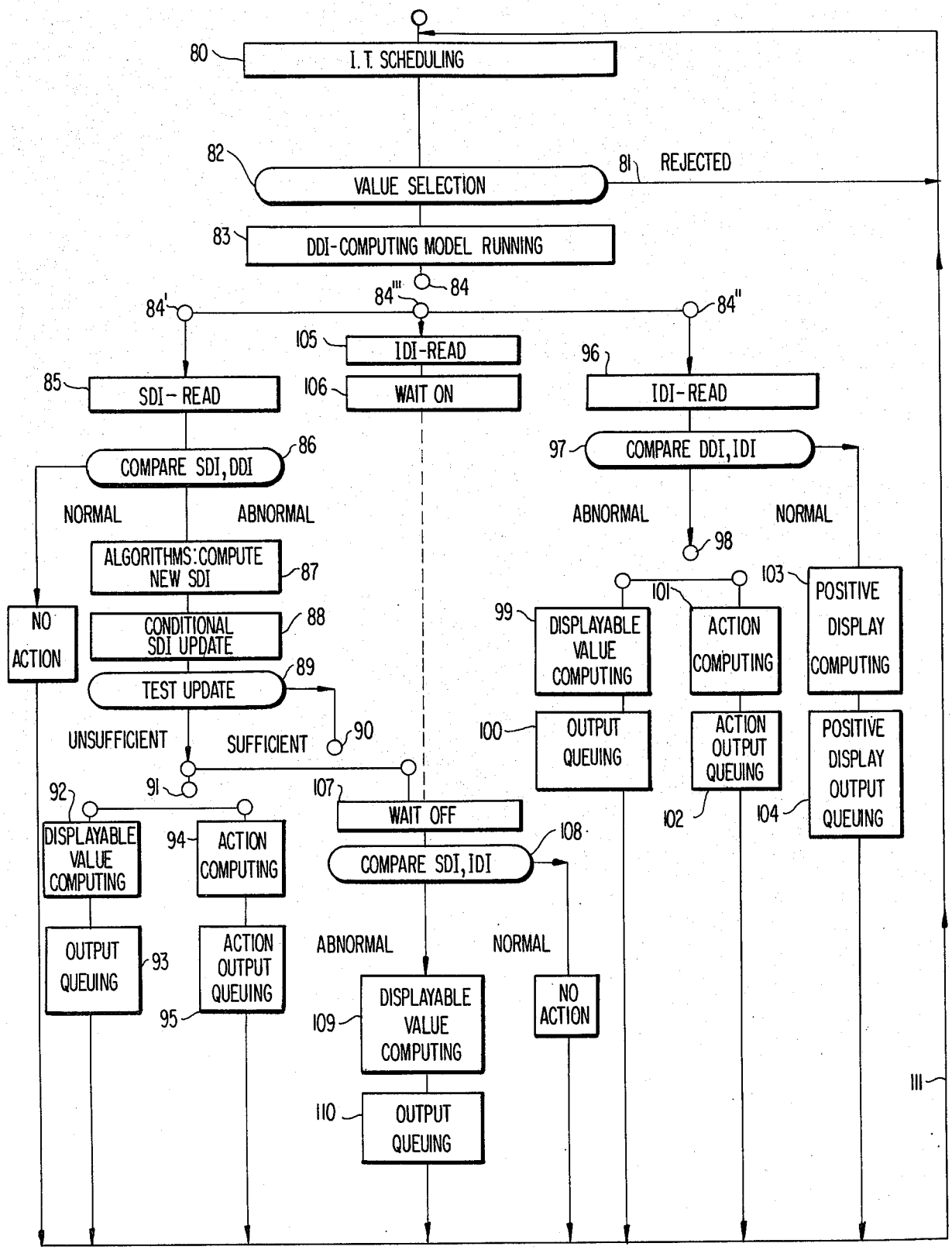
FIG. 5 corresponds to the generalized computing flowchart to FIG. 4.

According to the invention, FIG. 5 shows the general algorithm flowchart to this computer, FIG. 4; the explanations will follow the same flow of information than in FIG. 4 above.

In this drawing, the Interrupt Schedulers 65' and 65" at the computer inputs, materialize the Interrupt Scheduling, 80, i.e. the management of interruption from the simplex or multiplex input channel 61. Some interruptions will be rejected, at 81, after classical calculus of filtering, scaling, averaging, drift connections, etc., by item 82. The rejected interruptions transmit control to I.T. Scheduling 80 (handling of next interruption). In 83, the computing program of D.D.I. is activated. This program is in fact a model, giving a new D.D.I. output. The D.D.I. is present in buffered core memories 66' and 66".

Three tasks are activated simultaneously by specialized memories 69', 69" and 69"', which, for example may be assembled in a central computer or in three central processing units (CPU), connected channel to channel. In the drawing, reference 84' corresponds to comparison of SDI-DDI, reference 84" to comparison SDI-IDI, and reference 84"', to comparison IDI-DDI.

The first principal task in 85, will read S.D.I. in the input-output memory 2". An algorithm compares in 86 the values of SDI and DDI presents in 66" and 66" bis. If the comparison indicates a DDI normal relative to the SDI, no action is undertaken and the next interruption is handled via 111. If the comparison indicates an abnormal DDI, in 87, a new value of the SDI is calculated, eventually updating in 88 the old value, and storing it in input-output memory 2" for further use. Now if these modifications are not larger than a certain threshold, in 89, processing of 91 is activated, as described below; if on the other hand, these modifications of the S.D.I. are larger than this threshold, in 89, the computer activates, in parallel, tasks 91 and 107, in 90. In 91 the new start is made of two parallel tasks 92 and 94, of which the first corresponds to the computation of values to be displayed, calculated from values stored in S.D.I., remaining in memory 66' bis. In 93 these values are transmitted in the output queuing of the output channel for visual display. The second task 94, corresponds to the computation of the different values which will command the different controls of the vehicle, which are then placed with the output orders, in 95, in the output queuing 71 of the output channel.

The second principal task 96 is started in parallel to tasks 85 and 105. It starts with the reading of values contained in the IDI, stored in read only memory 2', or with the ascertainment that this reading has already been accomplished. In 97, values contained in DDI (in 66') and values read in IDI (in 66' bis) are compared, and in 98, if the result of the comparison shows differences above certain levels, two new tasks are started in parallel: tasks 99 and 101. The first calculates values to be displayed to the driver, as determined from the DDI, always present in 66'. These values are transmitted, in 100, to the output queuing of the output channel for actual display. Task 101 calculates the values to be attributed to certain command actions on the control gear of the car, through appropriate algorithms, always taking account of DDI and IDI present in 66' and 66' bis. These values, with the corresponding control codes are transferred to the output queuing 71 of the output channel. If the initial comparison between DDI and IDI has not shown an abnormal difference between both, in 103, one can calculate positive values, which are displayed. These positive values of satisfactory behaviour, in 104, are transferred to the output queuing of the output channel, 71, for actual display.

The third principal task, started in parallel, is started in 105. In a first step, it will read values contained in IDI, from 2' to 67''' bis, or remark that this reading has already being done, since the starting of the cycle (start of the car, for example). Once 105 is effectuated, this task will be put in a waiting position (wait positioned "on"). The reactivation of this task will only take place if the "wait" is suppressed, in 107, as a consequence of output 90 of test 89, i.e. if the values of SDI have changed enough. Now, in 108, a series of algorithms calculates the differences existing eventually between values contained in DDI and IDI. If these calculated differences are judged abnormal, in 109, are calculated certain values, which are to be displayed. In 110 these values are sent in the output queuing to be effectively displayed.

Finally, in 111, one returns to the handling of the next interruption.

In the following, different block diagrams will be indicated, with corresponding flowcharts, of embodiments of parts of the system according to the invention, so as to illustrate the above, and more especially show the practical introduction of algorithms in the computer.

Figure 6:
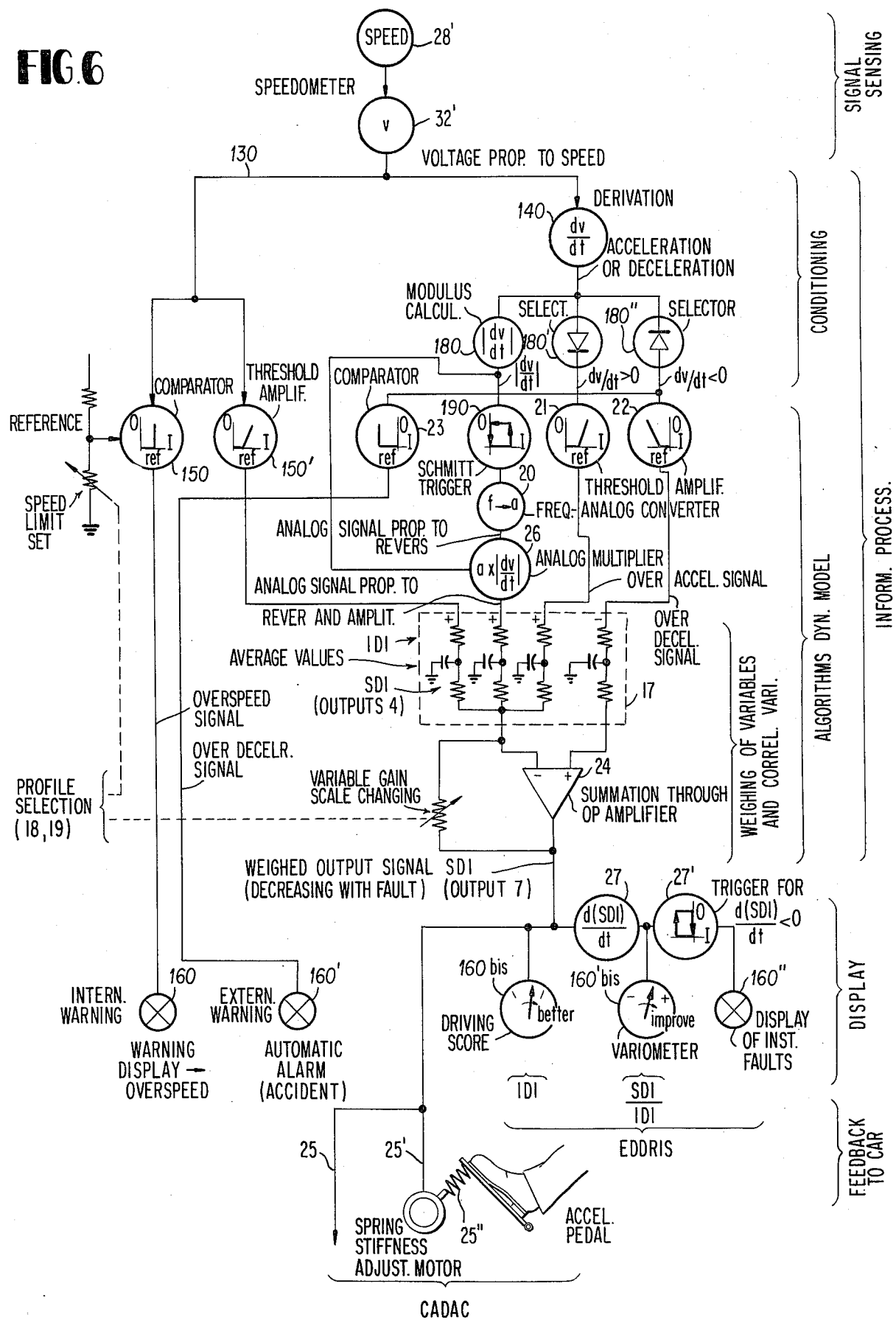
FIGS. 6, 7, 8, 9, and 10 are block diagrams and flowcharts of embodiments of parts of the system according to the invention.

FIG. 6 is a block diagram of an embodiment of the invention, greatly simplified, starting from only one sensor, measuring the speed 28'. One will take into account the following algorithms, in connection with the sensed signal proportional to speed v (32'), and with a signal easily calculated. Acceleration or deceleration dv/dt:

speeds above a certain speed-limit are considered dangerous, and of course, unlawful. This fault is considered proportional to the overspeed;

all speeds under this limit are considered normal, and conform to I.D.I. behaviour;

speed reversals, in a given time interval, represent speed irregularities, representative of an irregular driving pattern, which, in given road and traffic conditions, describes a lack of driving skill;

sudden, important accelerations, reduce power efficiency and raise gas-consumption, and are considered as negative;

accelerations under a certain limit-level are considered normal and representing I.D.I. behaviour;

sudden important decelerations, waste power, raise gas-consumption and demonstrate irregular and eventually dangerous driving patterns (and at least, a lack of anticipation);

sudden very important deceleration, (above the 1 g-range) demonstrate shock and accident; and deceleration under a certain limit-level, due more especially to engine-breaking, is considered normal, and representing I.D.I. behaviour.

The different algorithms are easily introduced in the embodiment shown in FIG. 6 of the invention, by simple analog circuitry. When one considers as reference, the corresponding I.D.I. i.e. giving a score 0 to low acceleration and deceleration, and a minimum number of speed reversals, all other described actions are negative, i.e. appear as "imperfection signals".

The speed signal 13 issued from the electric speedometer 32', feeds comparator 150, which is set at a fixed (or variable) speed limit, i.e. 55 miles per hour. Any actual speed above this value will trigger a warning lamp 160 at the dashboard display, and so incite the driver to slow down. The same speed limit is introduced as a threshold in amplifier 150, which delivers a signal proportional to overspeed. This later will be introduced hereunder in a special device network, 170, so as to establish with the other "imperfection signals" 20, 22, 23, and overall "weighed", i.e. significant driver imperfection score, of course, relative to the I.D.I, as defined.

The speed-signal 130 feeds to a differentiator 140, which calculates acceleration or deceleration dv/dt. This signal is fed, first, to a modulus calculator, 180, which establishes the absolute instantaneous value of dv/dt. (A four-diode rectifier, for example, will give this result). The modulus will drive a fixed threshold trigger, 190, (for example a Schmitt-trigger, with zero volt retriggering), followed by a frequency-analog converter, 20, (for example, a diode pump) which will deliver, after filtering, an analog signal proportional to speed reversals with a defined minimum of speed difference between reversals. This analog signal may be multiplied by the amplitude of the reversal signal, by multiplier 26, to have a model as close as possible to the algorithms (functions 180,190 and 20,26, represent a speed reversal calculation; the same, being true of course, for any other signal, represented as a variable voltage, as will be shown in other examples hereunder). The output of this reversal-signal, 26, proportional to speed irregularity and amplitude, is added, in the "modeling network" 170.

The speed derivation dv/dt, output of device 140, is now separated in its positive fraction by selector 180' (which may be a simple rectifier) and its negative part, by a similar selector 180''.

The positive part corresponds to accelerations only, and feeds a threshold amplifier, 21. Above a fixed acceleration level, still another imperfection signal is fed to modeling network 170. The negative part, corresponding to decelerations and feeds negative threshold amplifier 22 determining the level under which deceleration corresponds to fast and strong breaking (and even dangerous breaking). The output of this amplifier 22, feeds the modeling network 170, which will average and weigh the signals.

The negative part, will command too a comparator 23, switching above a high level of deceleration. This will control an automatic alarm device 160' like a four-way flasher for example, indicating a crash.

At the input of network 170 different signals are thus present; each one corresponding to a special task, representative of the driving behaviour of the driver, through the simple algorithms mentioned. These represent the D.D.I. of the driver, in an analog representation. The action of network 170 is twofold. It establishes first, in this case, by a simple capacitive filtering, an average value of the D.D.I., which corresponds to the updatable S.D.I. memory 2" of the general flowgraph. Secondly, it establishes, in this case, by a simple weighed addition at the input of an operational amplifier 24, an "overall" score of the driver, corresponding to output 7' of FIG. 1. Amplifier 24 is connected as a variable gain amplifier, through a feedback potentiometer. The possibility of adjusting this gain, and also, the possibility to set the speed limit of devices 150 and 150', correspond to the "profile selection", 18 and 19, mentioned in FIGS. 3 and 4.

By the above definition, the amplifier 24 output will be the more negative, the worse is the driving behaviour of the driver. Its output will be zero, i.e. correspond to the I.D.I., when the car is driven with small accelerations and decelerations, and with few speed reversals.

This output may be used, as inhibitive feed back, 25, to lower maximum speed and/or the maximum accelerations i.e. the gas admission (C.A.D.A.C.). It may be used, to stiffen the acceleration pedal 25", through a variable force spring-return of the pedal, by actuator 25'.

This output may be used, to display the driver's skill (similar to item 8' in FIG. 1). For example, a moving-coil current meter 160 bis, with its mechanical zero on the right end of the scale, will display a score proportional (display zero at left end) to the driving skill S.D.I. By the above definition of I.D.I., the maximum of deviation (to the right) corresponds to I.D.I.

This output may be used, as suggested earlier in items 9', 10' (FIG. 1) ater differentiation by item 27, for display of instantaneous variations of S.D.I., in 160' bis, and (through a trigger 27') for a warning display 160", with for example a red light at each instantaneous fault.

The simplified embodiment of part of the system according to the invention, may need, to be practical, more complicated algorithms and circuitry, for example, so as to take in account gear position, road profile, road occupancy and more particularly the direct braking action and the direct action of the accelerator, which allows consideration of direct variables, instead of indirect variables (determining breaking by deceleration, and acceleration pedal action, i.e. gas admission to the motor, by acceleration of the car). In other wrds, instead of considering an I.D.I. equal to zero (see above), actual partial I.D.I.'s per function are developed. The circuitry becomes more complex and has to go digital.

Figure 7:
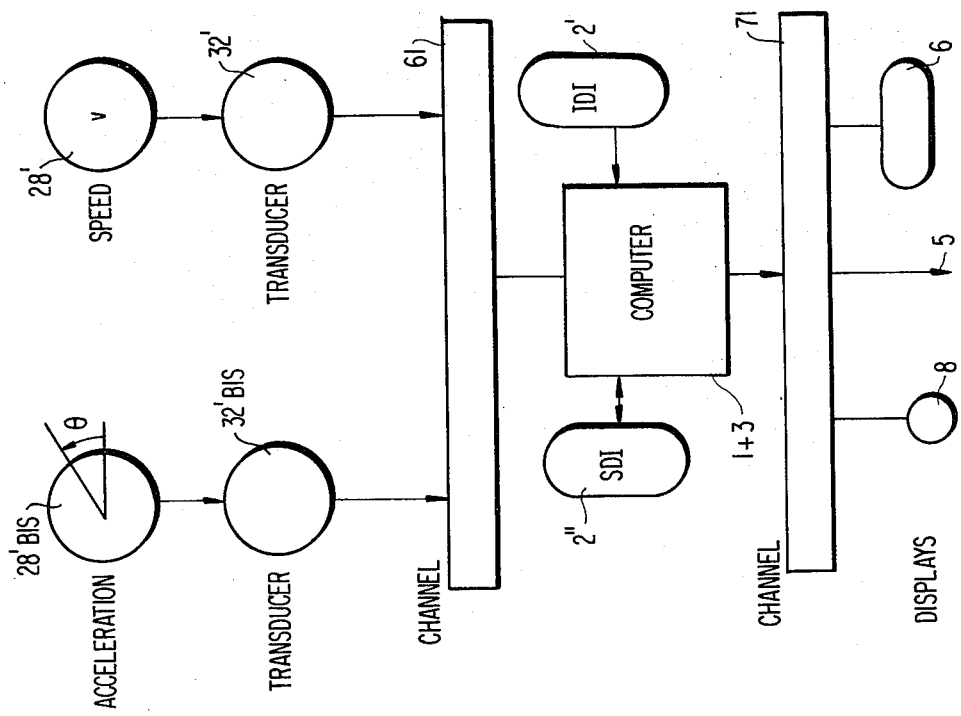
Figure 10:
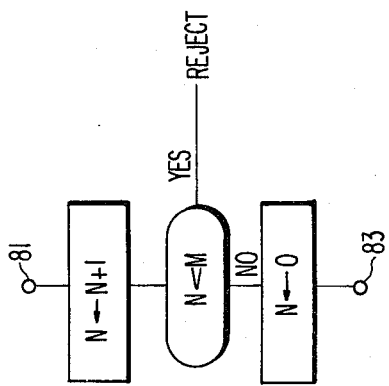

In the following example, FIG. 7 such a more advanced embodiment will be explained, and presented with its flowgraph, instead of actual circuitry, as in FIG. 6. This figure shows an embodiment of part of the system, according to the invention, where one takes into account the speedometer 32', as in FIG. 6, and a gas admission sensor 32' bis. The objective of this embodiment is, for example the minimisation of gas consumption, by anticipated limit speed approach (once again simplified, by considering the same road profile, road occupancy etc.)

The admission flap angle $\theta$, in 28' bis, is measured and transformed in electrical signal 32' bis. As in the last example, the cars' speed 28' is measured, and transformed in electrical signal v, 32'. S.D.I. is contained in memory 2", I.D.I. is contained in memory 2'. Computer 1+3 handles the informations coming from 2', 2" and $\theta$ through channel 61, and sends back the results to S.D.I. (2") and channel 71. Displays 6 and 8 signal the driver if he will (with an actual acceleration) override the speed-limit, or if his acceleration-speed ratio is convenient, output 5 corresponds to the feed back which may serve to control the opening $\theta$ of the flap, independently from the driver.

The work of the computer 1+3 will now be explained more in detail. First for a given angle $\theta$, the function f $(\theta,v)$ allowing the computation of a speed v, is known. Second, there is an ideal relationship $f_{I1}$ ($\theta$, v) between $\theta$ and v which minimizes gas consumption. Third, for a given acceleration increase $\Delta\theta$, one can calculate, with function f $(\theta,v)$, the corresponding increase of speed $\Delta v$. Additionally, there is an ideal relationship between variation $\Delta\theta$ and the desired variation $\Delta v$, one may call $f_{I2}$ ($\Delta\theta,\Delta v$). Fourth, the limit of speed, vlim, may, of course, be fixed or variable.

The different functions, $f_{I1}$ and $f_{I2}$, and values, vlim, are memorized in the I.D.I., 2'.

On the other hand, the past driving has determined the S.D.I., 2", of the driver; which is in this example:

$f_{S1}(\theta,v)$ effective relationships between $\theta$ and v, $f_{S2}(\Delta\theta,\Delta v)$ effective relationships between $\Delta\theta$ and $\Delta v$, and Nvlim number of times of overriding speed limit vlim.

Now, during the actual driving, through transducers 32' and 32' bis, actual speed $v_0$, as well as admission flap angle $\theta_0$, and new value, after acceleration $\theta_1$, are introduced into channel 6' (if $\theta_2$ is held long enough, the car will reach speed $v_1$, and perhaps pass vlim).

These informations are sent to computer 1+3, which will process them, following general algorithm of FIG. 5.

Figure 8:
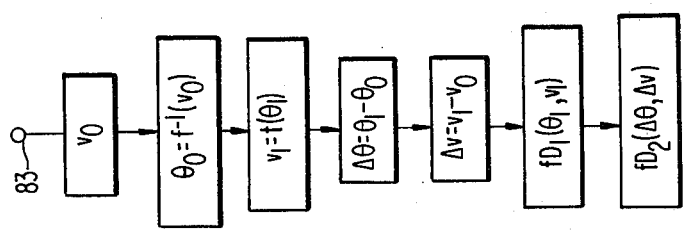

FIG. 8 shows, for this example, the general algorithm.

D.D.I. computing 83, receives input values $\theta_1$ (new flap angle) and speed $v_0$, at the moment of the start of acceleration. Starting from $v_0$ function f allows the computation of $\theta_0$, and then $\Delta\theta=\theta_1-\theta_0$. Starting from $\theta_2$ function f allows the computation of the speed $v_1$, which shall be attained; and so $\Delta v=v_1-v_0$. One then computes the D.D.I. Starting from $\theta_2$ and $v_1$, the gas consumption relation is determined: $f_{D1}$.

Starting from $\Delta\theta$ and $\Delta v$, one calculates $f_{D2}$, the relation between the observed flap angle variation and the speed variation which is reached.

In step "S.D.I. read", 85, in FIG. 5 the S.D.I. is entered into the computer, as calculated with the help of $f_{s1}(\theta_1, v_1)$ and $f_{s2}(\Delta\theta, \Delta v)$. (The same actions are performed, with I.D.I., in step 96). In step 86, S.D.I. and D.D.I. are compared, for example by subtracting the difference between corresponding functions:

$$f_{s1}(\theta_1, v_1) - f_{D1}(\theta_1, v_1), \text{ and}$$

$$f_{s2}(\Delta\theta, \Delta v) - f_{D2}(\Delta\theta, \Delta v).$$

If speed $v_1$ is higher than the limit speed vlim, the counter of speed-over riding is actualized. (the same actions are performed, between I.D.I. and D.D.I., in step 97).

In steps 87–88, if there is a noticable difference between D.D.I. and S.D.I., the last is actualized by actualizing functions $f_{s1}$ and $f_{s2}$. (the same action takes place between the new S.D.I. and I.D.I., in step 108).

In step 92, the observed differences between S.D.I. and D.D.I. are translated in a readable message. If $v_1 >$ vlim., i.e. the future speed will be greater than the limit speed, and indication "limit-speed will be exceeded", or a red lamp will be displayed at the output. If $(f_{s2} - f_{D2})$ is different from zero, one may display "too great an acceleration". Anomalous counter values may too be prepared for display here. Step 109, 99 and 103 follow the same procedure. Steps 94 and 101 establish the direct corrective action in car controls: for the limit speed, one calculates lim, the limit angle of the gas flap, corresponding to vlim: $\theta\text{lim} = \theta^{-1}$ (vlim.)

For the limit acceleration: starting from $f_{f2}$ and $\Delta v$, one calculates the acceleration step $\Delta\theta$, minimizing consumption, taking in account the desired speed $v_1$.

In this example too, of course, no account has been taken of gear change, road profile, road occupancy, etc., so as to simplify the explanation. The aim has been merely to show an application of the general flowchart, and the possibilities to optimise different factors, (factors representative for the I.D.I. and so for function EDDRIS).

Figure 9:
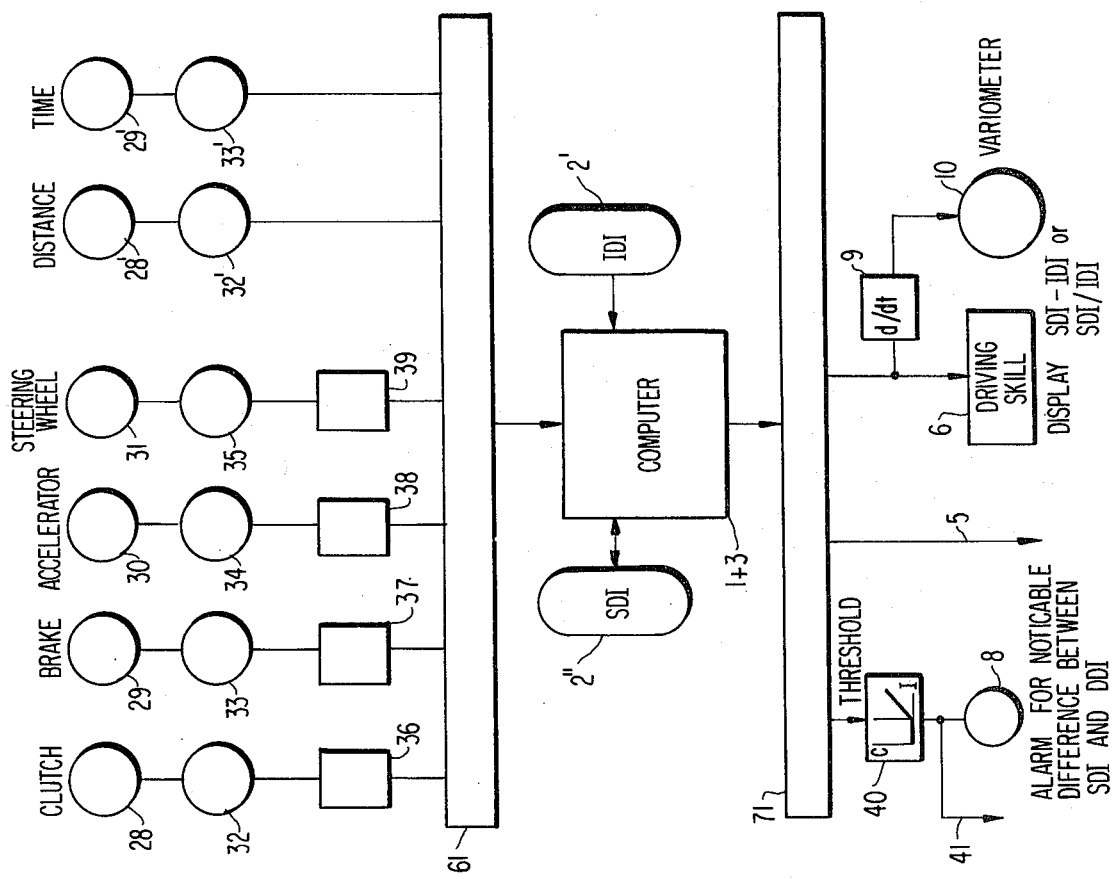

FIG. 9 is a block diagram of another embodiment of part of the system according to the invention. It will emphasize functions D.D.D. and EDDRIS, i.e., the comparison between S.D.I. and D.D.I., as shown on FIG. 1.

It will show too, the application of several general algorithms, as expressed at the beginning, concerning the frequency and profile of different control actions as for example the number of reversals and the action's intensity distribution in the frequency and time domain, which has been shown as highly correlated to a given driver, during all his life. This example, so as to simplify the description, will consider only control-reversals, from a number of direct variable sensors, i.e. signal proportional to the number of reversals of steering wheel, accelerator, break and clutch application, in addition to two independant variable sensors, i.e. distance (or speed, to be integrated) and time.

So as to show more clearly signal conditioning of the four direct variables, clutch 28, break 29, accelerator 30, steering wheel 31, and corresponding sensors 32, 33, 34, 35, conditioners 36, 37, 38, 39 are shown as part of signal sensing, instead of being included in the processor. Each of the last conditioners may be realized in the same way as functions 180, 190, 20, 26 of FIG. 6.

Independant variables are distance (or integrated speed) 28', and speed 29', with corresponding transducers 32' and 33'.

So as to show more clearly output signal use, threshold function 40 is shown separately, as connected to alarm 8, warning the appearance of a noticable difference between S.D.I. and D.D.I. as used in D.D.D. and PICOS.

Output 4' for example, may control the car ignition, and "lock" the car electrically. In the same way driving skill displays 6 and 10, shows, as explained earlier, the difference between S.D.I. and I.D.I., as for example by (I.D.I.-S.D.I.) or S.D.I./I.D.I.

Algorithms used in this example are all those mentioned in the illustrations in the summary of the invention, concerning a driver-road and a driver-machine interface. Here are some details concerning the computer. Working hypotheses are as follows: There exists an I.D.I., which can be written under form $C \times f(v)$, where C is homogeneous to the number of reversals of the controlled variables (clutch, brake, accelerator, steering wheel), and v is the speed of the vehicle.

The D.D.I. may be calculated from a certain number N of reversals and corresponds to $g(N) \times f(v)$.

The S.D.I. is calculated from successive D.D.I.'s, by a function, including more especially a principle of "amortization" of the past (for example, averaging, in net work 17 of FIG. 6). This amortization may be obtained more generally by a function of this type:

$$S.D.I._t \leftarrow S.D.I._{t-1} \times a + D.D.I._t \times b,$$

where a, b < 1 and a + b = 1,

For this embodiment the general algorithm is adapted in the following way (FIG. 5). In step 82, each reversal of any of the direct variables, provokes an interruption; but the interruption does not trigger automatically the calculation of a D.D.I.

In FIG. 9, as shown, value selection 82 manages variable N, initialized at O, and disposes of constant M, which defines the moment when D.D.I. will be calculated. When step 83 is activated, the number of reversals is equal to M.

Then, it will become necessary to calculate the driven distance, during these M reversals. The precedent value of odometer 32' has been memorized, $L_{t-1}$, as well as time, of the last calculation, $T_{t-1}$. So, $D.D.I. = g(M \times f[(L_t - L_{t-1})/(T_t - T_{t-1})])$ and T and L are actualized with values $T_t$ and $L_t$. In step 87, the new S.D.I. is calculated systematically in the following way:

$$S.D.I._t \leftarrow S.D.I._{t-1} \times a + D.D.I._t \times b$$

S.D.I. is updated systematically in step 89. The different steps 96, 97, 98 . . . 104 concern the comparison of I.D.I. and S.D.I., as detailed in earlier described embodiments.

In this example, the described outputs correspond to an overall score or index, as described by outputs 7' 7'' and 7''' of FIG. 1, and output of item 24, FIG. 6. Of course, separate parallel outputs of each algorithm are available, corresponding to lines 4', 4'' and 4''' of FIG. 1, and inputs to item 170 of FIG. 6, more especially to intervene in definite feedback control actions of the car, through lines 5 and 41 (CADAC).

It is evident, that here, too, in the embodiments described, many improvements may be added, like taking into account the actual horizontal profile of the road (where many steering-wheels reversals become indispensable!) and the actual vertical profile (where many speed, clutch, etc, actions become evident). One may take in account too, besides the speed or distance travelled, many other factors as variables, as mentioned in the summary and hereunder.

Finally, it is worthwhile to mention, that on a given road profile, and at a "normalized speed", the amplitude and frequency distribution of all these variables or their correlations may contribute to establish the "driver's signature". For example, profile-clutch action/braking, clutch action/speed, clutch action/acceleration, clutch and braking action/distance, etc. . . . represent significant factors.

A number of internal and external direct and indirect variables have been used in the different examples of embodiments of part of the invention; as well as a number of well-known and less well-known facts concerning driving patterns and driving correlations, which have made possible the different concepts around the "driving signature" principle.

It is evident, that many other rules, distinguishing a good driver from a bad driver may be applied, to the embodiments of the invention, through appropriate algorithms.

A few examples will show some of such algorithms, as suggested by common sense; examples, in relation with braking and clutch action (non automatic gear). In this domain, antiskid-devices are well-known. A permanent comparison of car speed and wheel speed detects skidding of the wheels, and instantaneous brake action is momentarily released when such skidding is detected. This is typically a closed-loop system around the small loop, arrow 15 and 16 in FIG. 3, involving only functions of the car, and no participation of the driver. One can envisage easily, in this application, that the loop closes with the driver included (arrows 15 and 17 in FIG. 3, i.e. a red light display (displays 6, 8, 10 of FIG. 3) warns the driver that skidding occurs, and he may realize, through a short apprenticeship, his own "human antiskid" function. (Takio. Kitano, "The Status of Automotive Electronics in Japan", S.A.E. conference, October 1974, Troy).

Both of these direct and indirect feedback principles are characteristic of the invention, but so also are several other important factors:

(a) introduction of correlated variables (of the system), and algorithms which may anticipate situations and corrections.

In the above example, different sensors of outside temperature and humidity may foresee the chances of ice formation and skidding; lateral accelerations, with programs of side effect friction coefficient automatic, small and very rapid steering wheel reversals or very short and strong brake applications may foresee lateral and longitudinal skidding, etc.

(b) automatic correction or inhibition may take place, not only on the brakes (in anticipation or during the action). To develop further the above example, the complete driving behaviour (maximum acceleration, maximum steering angles, maximum speed, etc), of the car may be modified after such anticipation, as well as dynamic characteristics of the car (blocking of differential, dynamic modification of elastic suspension and shock absorbers, etc.)

(c) education of driving skill will be provided permanently and display of all significant, personalized criteria. With the example cited, the driver will be challenged to a very regular driving (example of FIG. 9), to the correct use of accelerator, brake, etc.; he will be educated for correct acceleration-clutch-action, double-clutch action to avoid traction loss, correct execution of actions in case of curves and/or slopes, gear to be used, etc.

(d) avoiding of accidents, is part of the anticipation actions mentioned.

In the case of the example, inhibitions like limiting the steering angle, may avoid returning of the car, reducing speed may avoid breakaway, reducing brake-pressure may avoid skidding, etc.

It is important to acknowledge that, road safety is not reasonably tagged to only the vehicle, account has to be taken of driver behaviour and road conditions. It is evident, that if it is possible to define a reasonably "safe car" (i.e. ESV car, as mentioned at the beginning), drivers and roads cannot be "normalized". So, first, as this normalization is impossible, all corrective action has to come from the vehicle itself;

second, this interdependance "vehicle-driver-road" has to be established in a permanent dynamic manner, i.e., in so far as the last change, the vehicle itself has to be "adaptive" to be able to match itself automatically, so as to maintain the whole to an optimum safety level.

With the possibility of anticipative action and assessment of driving skill, the level of driving difficulties can be foreseen; with the possibility of judging in detail one driver's behaviour a posteriori (objective appreciation possible after having driven, in any conditions), it is possible to change the behaviour of the adaptive car, so as to provide an optimum fit between these two facts.

Instead of relying so, on an "average driver", who, with an "average car" on a "average road" drives in a safe manner, one has a vehicle with variable reactions and performances, depending directly on the "real conductor" and real "road conditions".

What is claimed:

1. In a motor vehicle having a plurality of manually controlled functions which affect variables in the operation of the motor vehicle in which a human operator forms a part of a feedback loop that controls a variable by observing the operation of said motor vehicle with respect to the actual value of said variable, by comparing said actual value with a desired value, and by controlling the corresponding manually controlled function, the improvement of an additional feedback loop comprising:

sensor means on said motor vehicle for generating a signal proportional to said variable;

computer means connected to said sensor means for processing said signal according to predetermined algorithms to define a dynamic driver image (D.D.I.), said computer means comprising, means for modifying said D.D.I. in relation to an ideal driver's image (I.D.I.) to produce a control output based at least partially on the modified D.D.I.;

control means responsive to said control output for modifying the responsiveness of said corresponding manually controlled function to operation by said human operator.

2. The improvement recited in claim 1, wherein said computer means comprises:

means for producing a standard driver's image (S.D.I.) based on a time averaged value of said D.D.I.;

wherein said modifying means produces said control output based on said modified D.D.I. and said S.D.I.

3. The improvement recited in claims 1 or 2 wherein said motor vehicle has an accelerator pedal which is manually depressed to control the speed of said motor vehicle, said variable is the speed of the motor vehicle, and said corresponding manually controlled function is said accelerator pedal.

4. The improvement recited in claim 3 wherein said control means is attached to said accelerator pedal and acts to increase resistance against the depression of said accelerator pedal.

5. The improvement recited in claim 2 wherein said computer means comprises:
differentiation means connected to receive said signal for providing an output proportional to the rate of change of said variable,
reversal calculator means connected to said differentiation means for providing an output proportional to the number of reversals in the rate of change of said variable, the outputs of said differentiation means and said reversal calculator means representing said D.D.I.;
weighting and averaging calculator means connected to receive the outputs of said differentiating means and said reversal calculator means for weighting the outputs thereof in relation to the I.D.I. and averaging the outputs thereof to establish a stored value representing said S.D.I., and
summing means connected to said weighting and averaging calculator means for generating said control output.

6. The improvement recited in claim 5 wherein said motor vehicle has an accelerator pedal which is manually depressed to control the speed of said motor vehicle, said variable is the speed of the motor vehicle, and said corresponding manually controlled function is said accelerator pedal.

7. The improvement recited in claim 6 wherein said differentiation means provides two outputs to said weighting and averaging calculator means, the first of said two outputs being proportional to accelerations exceeding a predetermined minimum acceleration and the second of said two outputs being proprortional to decelerations exceeding a predetermined minimum deceleration.

8. The improvement recited in claim 7 wherein said computer means further comprises:
threshold means connected to receive said signal for providing an output when the speed of said motor vehicle exceeds a preset threshold value, the output of said threshold means being provided to said weighting and averaging calculator means.

9. The improvement recited in claim 8 further comprising:
profile selection means connected to said computer means for controlling said threshold means and said control output means to modify said control output.

10. The improvement recited in claim 5 further comprising:
display means connected to receive the control output of said computer means for providing a display indicating the relationship of said D.D.I. and said S.D.I. to said I.D.I.

11. The improvement recited in claim 5 wherein said computer means is an analog computer and said reversal calculator means comprises:
an absolute value modulus calculator which produces an output proportional to the instantaneous absolute value of the rate of change of said variable,
a threshold trigger driven by the output of said absolute value modulus calculator, said threshold trigger producing a variable frequency output, and
a frequency-analog converter connected to receive said variable frequency outputs, said frequency-analog converter providing an output proportional to the number of reversals in the rate of change of said variable occurring within a predetermined minimum time period.

12. The improvement recited in claim 11 wherein said reversal calculator means further comprises:
a multiplier connected to receive as inputs the outputs of said absolute value modulus calculator and said frequency-analog converter, said multiplier having an output connected to said weighting and averaging calculator means.

13. The improvement recited in claim 11 wherein said weighting and averaging calculator means comprises:
a modeling network comprising resistors and capacitors, said resistors serving to weight the input signals to said network and said capacitors serving to average and store the weighted signals.

14. The improvement recited in claim 1 wherein said computer means comprises:
differentiation means connected to receive said signal for providing an output proportional to the rate of change of said variable,
reversal calculator means connected to said differentiation means for providing an output proportional to the number of reversals in the rate of change of said variable, the outputs of said differentiation means and said reversal calculator means representing said D.D.I.;
weighting means connected to receive the outputs of said differentiating means and said reversal calculator means for weighting the outputs thereof in relation to the I.D.I., and
summing means connected to said weighting means for generating said control output.

15. The improvement recited in claim 14 wherein, said motor vehicle has an accelerator pedal which is manually depressed to control the speed of said motor vehicle, said variable is the speed of the motor vehicle, and said corresponding manually controlled function is the said accelerator pedal.

16. The improvement recited in claim 15 wherein said differentiation means provides two outputs to said weighting means, the first of said two outputs being proportional to accelerations exceeding a predetermined minimum acceleration and the second of said two outputs being proportional to decelerations exceeding a predetermined minimum deceleration.

17. The improvement recited in claim 16 wherein said computer means further comprises:
threshold means connected to receive said signal for providing an output when the speed of said motor vehicle exceeds a preset threshold value, the output of said threshold means being provided to said weighting means.

18. The improvement recited in claim 17, further comprising:
profile selection means connected to said computer means for controlling said threshold means and said control output means to modify said control output.

19. The improvement recited in claim 14 wherein said computer means is an analog computer and said reversal calculator means comprises:

an absolute value modulus calculator which produces an output proportional to the instantaneous absolute value of the rate of change of said variable, a threshold trigger driven by the output of said absolute value modulus calculator, said threshold trigger producing a variable frequency output, and a frequency-analog converter connected to receive said variable frequency output for providing an output proportional to the number of reversals in the rate of change of said variable occurring within a predetermined minimum time period.

20. The improvement recited in claim 19 wherein reversal calculator means further comprises:

a multiplier connected to receive as inputs the outputs of said absolute value modulus calculator and said frequency-analog converter, said multiplier having an output being connected to said weighting means.

21. The improvement recited in claim 19 wherein said weighting means comprises:

a modeling network comprising resistors, said resistors serving to weight the input signals to said network.

22. The improvement recited in claims 19, 20, 21, 10, 11, 12 or 13 wherein said motor vehicle has an accelerator pedal which is manually depressed to control the speed of said motor vehicle, said variable is the speed of the motor vehicle, and said corresponding manually controlled function is said accelerator pedal.

23. The improvement recited in claim 22 wherein said control means is attached to said accelerator pedal and acts to increase resistance against the depression of said accelerator pedal.

* * * * *